United States Patent [19]
Laughlin

[11] Patent Number: 4,718,276
[45] Date of Patent: Jan. 12, 1988

[54] ANGULAR MOTION SENSOR

[75] Inventor: Darren R. Laughlin, Albuquerque, N. Mex.

[73] Assignee: Applied Technology Associates, Inc., Albuquerque, N. Mex.

[21] Appl. No.: 850,129

[22] Filed: Apr. 10, 1986

[51] Int. Cl.⁴ .................... G01P 15/08; H02K 44/10
[52] U.S. Cl. ................................. 73/516 LM; 310/11
[58] Field of Search ............. 73/516 LM, 517 A, 652, 73/654; 310/11

[56] References Cited

U.S. PATENT DOCUMENTS

| | | | |
|---|---|---|---|
| 2,753,469 | 7/1956 | Statham et al. | 73/516 LM |
| 3,306,113 | 2/1967 | Tuccinardi | 73/516 LM |
| 3,618,399 | 11/1971 | Aske | 73/505 |

*Primary Examiner*—John Chapman
*Attorney, Agent, or Firm*—Fleit, Jacobson, Cohn & Price

[57] ABSTRACT

A solid electrode in the core of an angular motion sensor has a body of conductive fluid confined therein within an annular flux gap between axially spaced magnets. An arrangement of slots in the walls of the electrode modifies the current, induced in the fluid by inertial displacement, into a circumferential component, which is inductively coupled to an output winding from which an output signal is obtained.

4 Claims, 7 Drawing Figures

ANGULAR MOTION SENSOR

BACKGROUND OF THE INVENTION

This invention relates to improvements in motion sensors of the type in which a body of electrically conductive fluid is inertially displaced along a confined path through a magnetic field to induce therein an electric current reflecting the motion of the sensor body.

Sensors of the foregoing type, referred to as magnetohydrodynamic sensors, are generally well known and are usually operative to measure angular acceleration. Use of this type of sensor with modification to sense and thereby measure angular velocity is also known as disclosed in U.S. Pat. Nos. 3,618,399 and 4,188,576 to Aske and Jacob, respectively. According to the Aske patent, the sensor is provided with a measurement axis along which an output is obtained as its angular relationship to a sensitive axis varies with time during acceleration of the sensor about such sensitive axis. A velocity or angular rate measurement is extracted as a desired component of the output signal at the measurement axis by signal demodulating means. According to the Jacobs patent, fluid is ejected from a rotating nozzle as a free flowing jet through a magnetic field to induce current in the jet from which the angular rate measurement is extracted through pick-ups rotating with the nozzle. The foregoing angular motion sensors thus require moving parts and signal extracting electronics which severly limit velocity sensitivity.

It is therefore an important object of the present invention to provide a relatively small size magnetohydrodynamic sensor having no moving parts with an acceptable sensitivity to changes in angular rate for a useful range of angular vibration frequencies.

Another object is to provide a self-generating sensor of the foregoing type from which a measurable angular motion signal is directly obtained without amplification.

SUMMARY OF THE INVENTION

In accordance with the present invention, a body of conductive fluid is confined to a circular flow path for inertial displacement relative to a magnetic core within which inductive transformer coupling components are mounted for angular displacement with the fluid about a single sensitivity and measurement axis. One of the inductive coupling components is in the form of a solid annular electrode within which the fluid flow path is formed by an annular flux gap between opposite polarity pole faces of two permanent magnets fixely mounted with the coupling components in the core. The annular electrode of said one inductive component in contact with the body of fluid is provided with an arrangement of slots to thereby convert the electric current otherwise induced into a relatively large circumferential component thereof efficiently coupled inductively to an output winding associated with the other inductive component. The output winding accordingly provides an output signal at the single axis of the sensor which is a substantially direct function of angular rate within wide ranges of angular vibration frequencies, such as 1 to 10,000 Hertz.

In accordance with certain embodiments of the invention, the current converting slot arrangement in the solid annular electrode includes a plurality of equal angularly spaced slot formations extending through radially inner and outer cylindrical walls of the electrode and its bottom wall, all below the flux gap channel within which the fluid is confined between the axially spaced magnets. The slot formations extend at the same acute angle of 45° to the single sensor axis at slot intersections with the cylindrical walls and at 45° to the radius along the bottom wall. Additional radial slots are also formed in the cylindrical walls angularly spaced from the radial end sections of the first mentioned slot formations.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
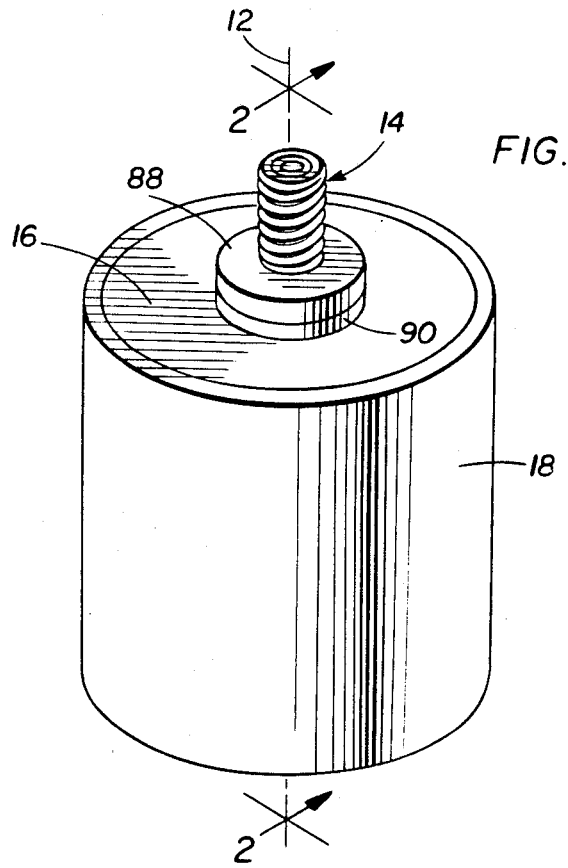
FIG. 1 is a perspective view of a sensor constructed in accordance with one embodiment of the invention.

Referring now to the drawings in detail, FIG. 1 illustrates a typical angular motion sensor constructed in accordance with the present invention, generally referred to by reference numeral 10. The sensor has a generally cylindrical shape in the illustrated embodiment and is of a relatively small size, such as one-inch in diameter and one-inch in axial length along its geometric axis 12 about which the sensor is angularly displaced to measure angular speed or rate. An output velocity signal is obtained from the sensor through a coaxial cable connector 14 projecting in axial alignment with axis 12 from a circular lid 16 secured to one axial end of a cylindrical housing 18 made of a magnetic shielding material.

Figure 3:
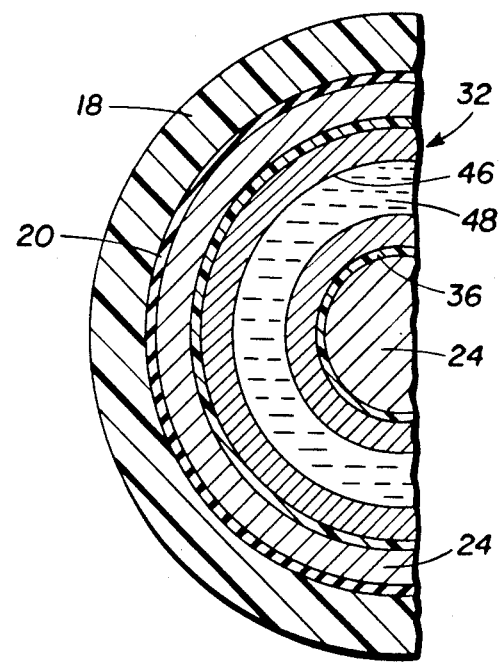
FIG. 3 is a partial transverse section view taken substantially through a plane indicated by section line 3—3 in FIG. 2.
Figure 2:
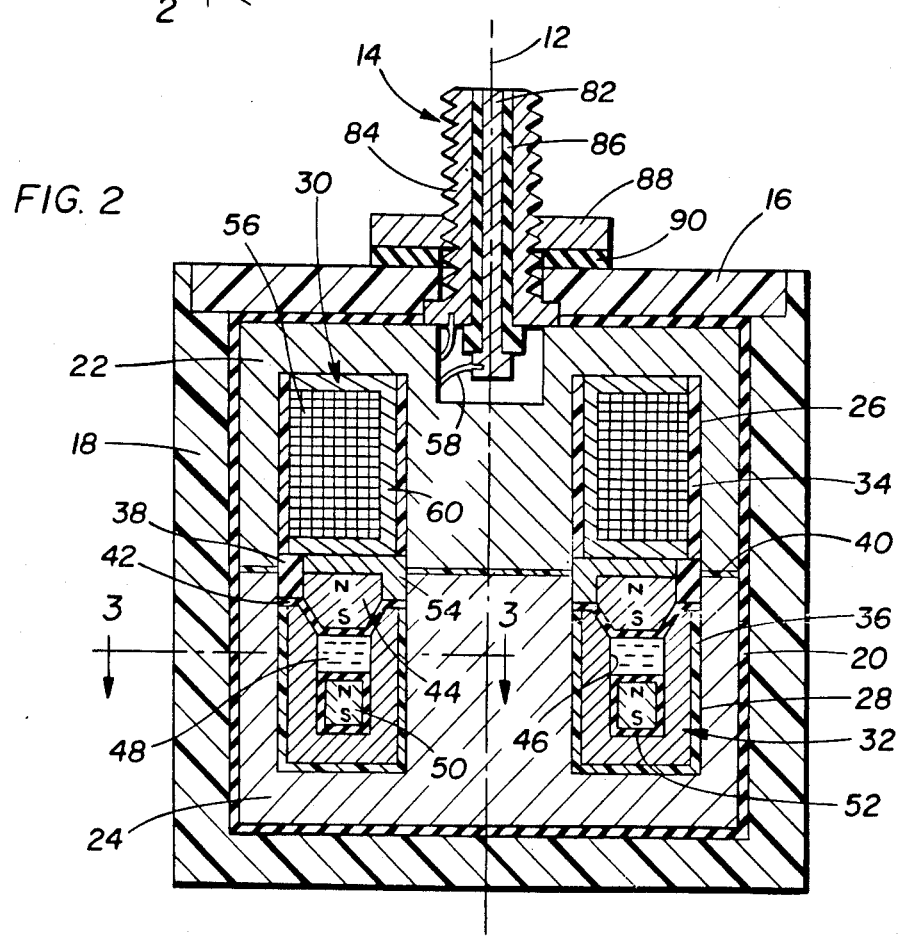
FIG. 2 is an enlarged side section view taken substantially through a plane indicated by section line 2—2 in FIG. 1.

As more clearly seen in FIGS. 2 and 3, the housing 18 has an insulating liner 20 to enclose and magnetically shield two sections 22 and 24 of a pot-shaped magnetic core made of ferrite or nickel-iron. The core sections are formed with confronting annular cavities 26 and 28 axially aligned with a single measurement axis coincident with the axis 12. Transformer secondary and primary inductive components 30 and 32 are respectively seated within the cavities and secured in place by epoxy potting 34 and 36. An annular insulating spacer 38 bridges the epoxy interface 40 between the core sections in abutment with the secondary component 30 and a rubber gasket 42. The gasket 42 abuts the primary component 32 to form a non-magnetic holder for an annular permanent magnet 44. The magnet 44 has a pole face portion seated on the holder 42 which also acts as a cover sealing an annular flow channel 46 formed in the primary component 32. A body of electrically conductive fluid 48, such as liquid mercury, is thereby retained or confined within the channel 46 occupying the flux gap between the pole face of magnet 44 and the pole face of opposite polarity of a second annular permanent magnet 50 held in its own non-magnetic holder 52. The magnets 44 and 50 thus establish a magnetic field in the flux gap channel 46 so as to induce a circulatory electrical current in the mercury 48 in response to its inertial displacement relative to the core when the sensor is rotated about its axis 12.

The pole face of magnet 44 aligned with the interface 40 between the core sections has a pole cap 54 spacing it from the secondary component 30. The secondary component includes an output winding 56 from which electrical signal leads 58 extend to the coaxial cable connector 14. The winding 56 is mounted on an annular bobbin 60 seated in the cavity 26 so as to be aligned in inductive relation to the primary component 32 in cavity 28 of the core.

Figure 4:
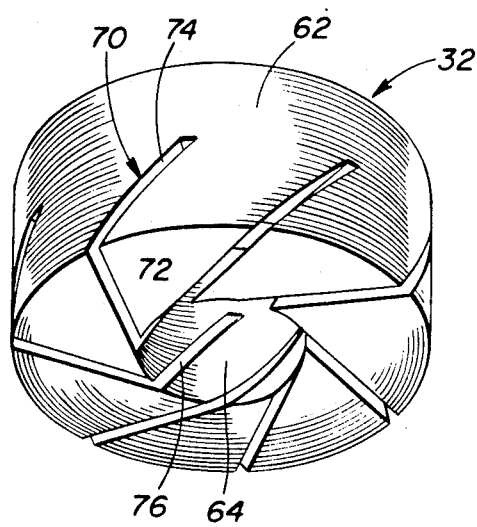
FIG. 4 is a bottom perspective view of the primary inductive electrode component of the sensor disabled from the sensor.
Figure 5:
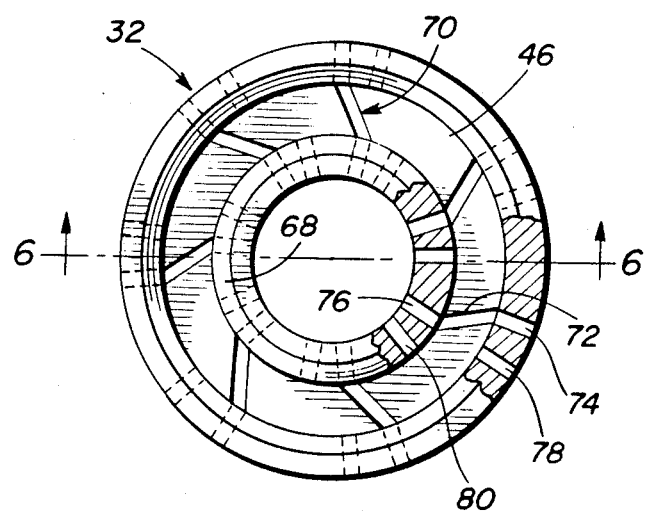
FIG. 5 is a top plan view of the component shown in FIG. 4, with parts broken away and shown in section.
Figure 6:
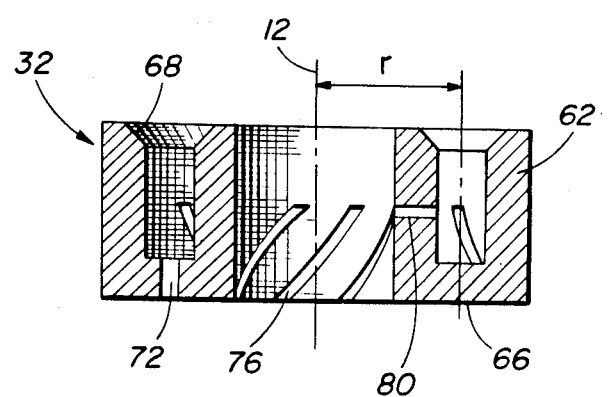
FIG. 6 is a side section view taken substantially through a plane indicated by section line 6—6 in FIG. 5.

As more clearly seen in FIGS. 4, 5 and 6, the primary component 32 is formed by a solid annular electrode member made of molybdenum or oxygen free copper. The electrode member being in electrical contact with the body of mercury 48 within channel 46, will conduct current therefrom. Radially outer and inner wall portions 62 and 64 of the electrode member are interconnected by a bottom wall porton 66 to form the annular channel 46 and establish a circular flow path for the body of mercury having a radius (r) as shown in FIG. 6. The upper axial end of the electrode member has a conical seat portion 68 on which the gasket channel cover and magnet holder 42 is positioned.

Relative displacement of the body of mercury 48 within channel 46 through the transversely extending flux of the magnetic field between the pole faces of magnets 34 and 50, induces a circulatory current through the mercury during its displacement or flow in a circular path as aforementiond. Such current is directionally modified into circumferential and radial components when conducted through the annular electrode member of primary component 32 by an arrangement of slots or cuts formed therein. Such slot arrangement includes seven slot formations 70 angularly spaced from each other by equal amounts. Each slot formation includes an intermediate section 72 extending through the bottom wall 66 between a radially outer section 74 in outer wall portion 62 and a radially inner section 76 extending through inner wall portion 64. The slot sections 72 extend at acute angles of 45° between the radially inner and outer sections thereof in a plane perpendicular to the axis 12, while said inner and outer sections intersect the cylindrical surfaces of the wall portions at the same 45° angles to lines parallel to the axis. Each of the slot formations also terminates in axially spaced relation to the upper conical end portion 68 below the body of mercury. Further, additional radial slots 78 and 80 are formed in the wall portions 62 and 64 in angularly spaced relation to the slot sections 74 and 76.

As a result of the foregoing slot arrangement and configuration of the component 32, a substantial circumferential component of induced current is established in the body of mercury and a relatively small radial component. The circumferential current component is efficiently coupled inductivity to the output winding 56 of the secondary component 30 to produce an output signal that is found to be a substantially direct function of fluid velocity. The output signal is conducted from winding 56 through conductor leads 58 to the inner terminal element 82 and the threaded outer terminal element 84 of the coaxial connector 14. The terminal elements are separated by an insulating sleeve 86 and are locked to the lid 16 by a nut 88 and an underlying washer 90 as more clearly seen in FIG. 2.

Figure 7:
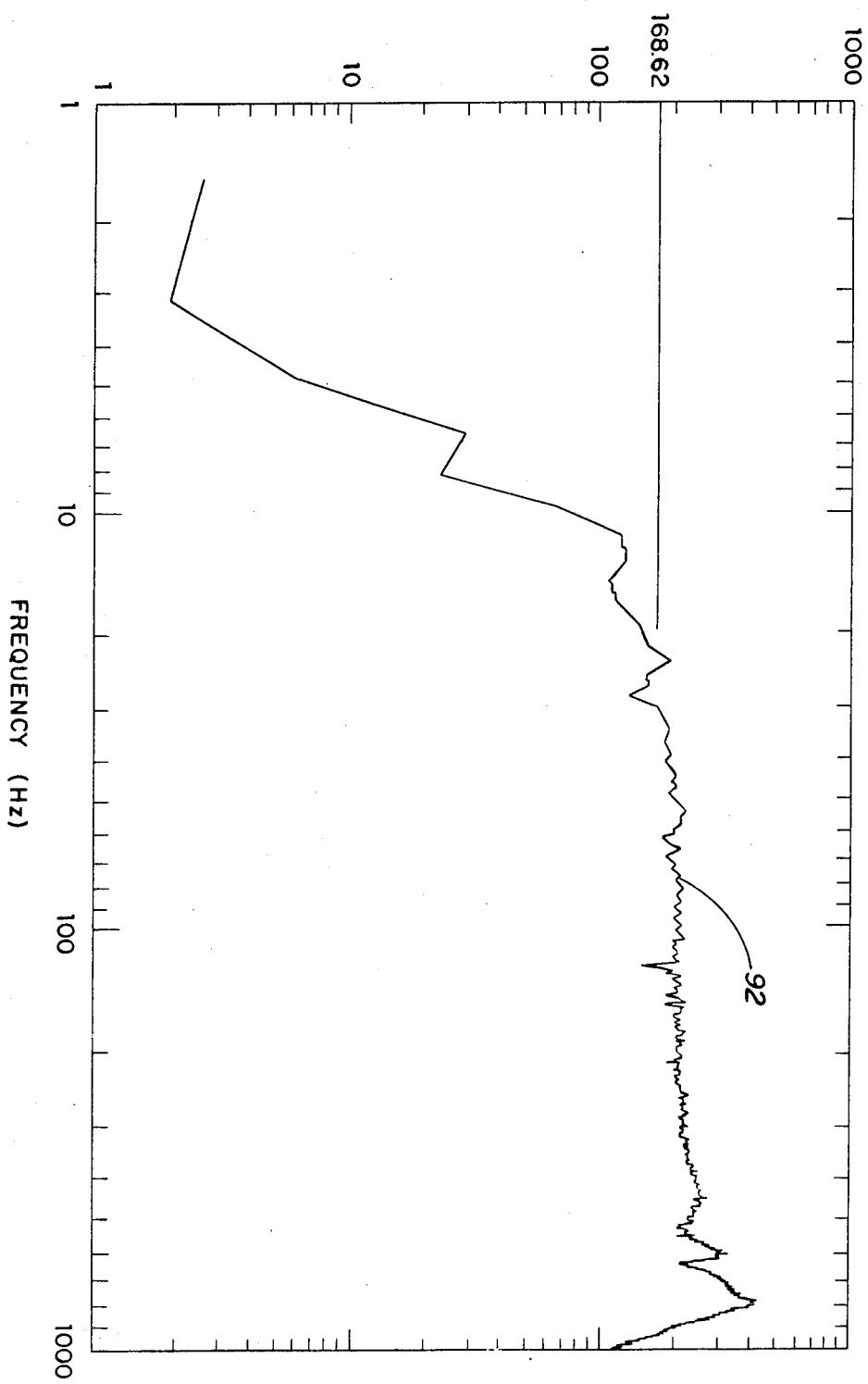
FIG. 7 is a graph illustrating the tested operating characteristics of one embodiment of the invention.

The small radial component of the current induced is converted by the primary component 32 into an output current which may be amplified by an additional coil wound on the axis of the sensor. The sensor is otherwise sufficiently sensitive to changes in angular rate (w) without signal amplification within an operative range of angular vibration frequencies as depicted by curve 92 in FIG. 7 with respect to one embodiment of the invention. Curve 92 represents a velocity sensitivity transfer function (Sv) determined by testing, using a 2000 gain amplifier, to be equal to 168.62 volts/radian/second for such embodiment between frequency limits of 10 Hz and 1000 Hz. Further, it was found that the sensitivity function (Sv) is approximately proportional to the square of the radius (r) of the circular channel path for the body of mercury. Thus, in the operating frequency range, the output signal voltage (V) equals the product of the sensitivity function (Sv) and the angular rate (w), $[V=(Sv)(w)]$, for direct velocity or speed measurement purposes.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In angular motion sensor having an electrically conductive fluid flowing along a predetermined path, means for producing a magnetic field through which the fluid flows along said path and electrode means in contact with said fluid for detecting electric current induced therein, the improvement comprising means for modifying said induced current detected by the electrode means and coupling means mounted in inductive relation to the electrode means for converting the modified induced current into an output signal, said electrode means being a solid annular member within which the fluid is confined, said current modifying means comprising slot means formed in the member at angle to said path for producing a circumferential component of the induced current in the annular member inductively coupled to the coupling means.

2. The improvement as defined in claim 1 wherein said predetermined path is a circle having an axis extending centrally through the electrode means.

3. The improvement as defined in claim 2 wherein said coupling means includes a core within which the electrode means is mounted and an output winding mounted in the core in inductive relation to the electrode means.

4. The improvement as defined in claim 2 wherein the solid annular member has radially outer and inner wall portions interconnected by a bottom wall portion to define an annular channel within which the fluid is confined, said slot means comprising a plurality of angularly spaced slots extending through said wall portions of the annular member intersecting the outer and inner wall portions at equal acute angles to said axis, and additional angularly spaced slots extending radially through the outer and inner wall portions in angularly spaced relation to said first mentioned slots.

* * * * *